United States Patent [19]

Althaus et al.

[11] Patent Number: 5,518,311
[45] Date of Patent: May 21, 1996

[54] MIXING CHAMBER WITH VORTEX GENERATORS FOR FLOWING GASES

[75] Inventors: Rolf Althaus, Flawil; Alexander Beeck, Engingen; Yau-Pin Chyou, Dottikon; Adnan Eroglu, Untersiggenthal, all of Switzerland

[73] Assignee: ABB Management AG, Baden, Switzerland

[21] Appl. No.: 225,397

[22] Filed: Apr. 8, 1994

[30] Foreign Application Priority Data

Apr. 8, 1993 [CH] Switzerland .................. 01086/93

[51] Int. Cl.$^6$ .................. B01F 5/00; B01F 15/02
[52] U.S. Cl. .................. 366/181.5; 366/337; 138/37
[58] Field of Search .................. 165/109.1; 366/177, 366/178, 336–340, 181.5; 48/189.4; 138/37–39, 114

[56] References Cited

U.S. PATENT DOCUMENTS

| | | | |
|---|---|---|---|
| 1,022,493 | 4/1912 | Meigs | 138/37 |
| 1,454,196 | 5/1923 | Trood | 48/189.4 |
| 1,466,006 | 8/1923 | Trood | 48/189.4 |
| 3,051,452 | 8/1962 | Nobel | 366/337 |
| 3,239,197 | 3/1966 | Tollar | 138/42 X |
| 3,404,869 | 10/1968 | Harder | 366/338 |
| 3,671,208 | 6/1972 | Medsker . | |
| 4,164,375 | 8/1979 | Allen | 366/337 |

FOREIGN PATENT DOCUMENTS 55-16696  5/1980  Japan .................. 366/337

*Primary Examiner*—Charles E. Cooley
*Attorney, Agent, or Firm*—Burns, Doane, Swecker & Mathis

[57] ABSTRACT

A mixing chamber for introducing a gaseous secondary flow into a gaseous, ducted main flow includes a plurality of vortex generators to facilitate mixing of the flows. The secondary main flow has a substantially smaller mass flow than the main flow. The main flow is guided via the plurality of vortex generators arranged adjacent to one another over the width or the periphery of the duct through which flow takes place. The height (h) of the vortex generators is at least 50% of the height (H) of the duct through which flow takes place. The secondary flow is fed into the duct in the immediate region of tile vortex generators. The mixing chamber according to the invention exhibits extraordinarily short mixing distances in the mixing chamber with a simultaneously low pressure loss.

18 Claims, 4 Drawing Sheets

1

MIXING CHAMBER WITH VORTEX GENERATORS FOR FLOWING GASES

BACKGROUND OF THE INVENTION

1. Field of the Invention

The invention relates to a mixing chamber in which a gaseous secondary flow is introduced into a gaseous, ducted main flow, the secondary flow having a substantially smaller mass flow than the main flow.

2. Discussion of Background

Cold streaks, which occur for example due to cooling air being fed into the combustion air, can be found in the main flow in combustion chambers. Such streaks can lead to inadequate burn-out in the combustion zone. Measures have therefore to be taken in order to mix the combustion air and cooling air thoroughly.

The mixing of a secondary flow with a main flow present in a duct takes place, as a rule, by radial introduction of the secondary flow into the duct. The momentum of the secondary flow, however, is so small that even almost complete mixing only takes place after a distance of approximately 100 duct heights.

SUMMARY OF THE INVENTION

Accordingly, one object of the invention is to provide a mixing chamber, of the type mentioned at the beginning, with a novel appliance by means of which longitudinal vortices without a recirculation region can be generated in the duct through which flow takes place.

This is achieved in accordance with the invention wherein the main flow is guided via vortex generators, of which a plurality are arranged adjacent to one another and preferably without intermediate spaces over the width or the periphery of the duct through which flow takes place, the height of the vortex generators being at least 50% of the height of the duct through which flow takes place or of the height of the duct part associated with the vortex generator, and wherein the secondary flow is led into the duct in the immediate region of the vortex generators.

Using the novel static mixer, which is represented by the three-dimensional vortex generators, it is possible to achieve extraordinarily short mixing distances in the mixing chamber with a simultaneously low pressure loss. Rough mixing of the two flows has already been completed after one full rotation of the vortex whereas fine mixing due to turbulent flow takes place after a distance which corresponds to just a few duct heights.

A vortex generator according to the present invention has three surfaces around which flow takes place freely, which surfaces extend in the flow direction, one of them forming the top surface and the others forming the side surfaces, wherein the side surfaces abut the same duct wall and enclose the acute angle α between them, wherein a top surface edge extending transverse to the duct through which flow takes place is in contact with the same duct wall as the side walls, and wherein the longitudinally directed edges of the top surface, which abut the longitudinally directed edges of the side surfaces protruding into the flow duct, extend at an angle of incidence Θ to the duct wall.

The advantage of such a vortex generator may be seen in its particular simplicity in every respect. The element, which consists of three walls around which flow takes place, is completely unproblematic from the point of view of manufacture. The top surface can be joined to the two side surfaces in various ways. The fixing of the element onto flat or curved duct walls can also take place by means of simple welds in the case of weldable materials. From the point of view of fluid mechanics, the element has a very low pressure loss when flow takes place around it and it generates vortices without a dead water region. Finally, the element can be cooled in different ways and with various means because of its generally hollow internal space.

It is useful to select the ratio between the height h of the connecting edge of the two side surfaces and the duct height H in such a way that the vortex generated fills the complete duct height, or the complete height of the duct part associated with the vortex generator, immediately downstream of the vortex generator. The large-scale vortices generated ensure that a similar distribution is present in every plane behind the vortex generator.

Because a plurality of vortex generators are arranged adjacent to one another without intermediate spaces over the width of the duct through which flow takes place, the complete duct cross section is already being fully acted on by the vortices shortly behind the vortex generators.

It is useful for the two side surfaces enclosing the acute angle α to be arranged symmetrically about an axis of symmetry. Equal-swirl vortices are generated by this means.

If the two side surfaces enclosing the acute angle α form between them an at least approximately sharp connecting edge which, together with the longitudinal edges of the top surface, form a point, the flow cross section is almost unimpaired by blockage.

If the connecting edge is the outlet edge of the vortex generator and if it extends at right angles to the duct wall which the side surfaces abut, the non-formation of a wake region is advantageous. In addition, a vertical connecting edge leads to side surfaces which are likewise at right angles to the duct wall. This provides the vortex generator with the simplest possible shape and the shape most favorable for manufacture.

If the axis of symmetry extends parallel to the duct axis and the connecting edge of the two side surfaces forms the downstream edge of the vortex generator whereas the top surface edge extending transverse to the duct through which flow takes place is, in consequence, the edge which the duct flow meets first, two equal and opposing vortices are generated on one vortex generator. A neutral-swirl flow pattern is present in which the direction of rotation of the two vortices rises in the region of the connecting edge.

For certain applications, it is expedient for the angle of incidence Θ of the top surface and/or the acute angle α of the side surfaces to be selected in such a way that the vortex generated by the flow has already broken down in the region of the vortex generator. The possible variation of the two angles provides a simple means of aerodynamic stabilization, independent of the cross sectional shape of the duct through which flow takes place. The duct can be either wide and low or narrow and high and can be provided with flat or curved duct walls.

Further advantages of the invention, particularly in association with the arrangement of the vortex generators and the feeding of the secondary flow, are given in the subclaims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
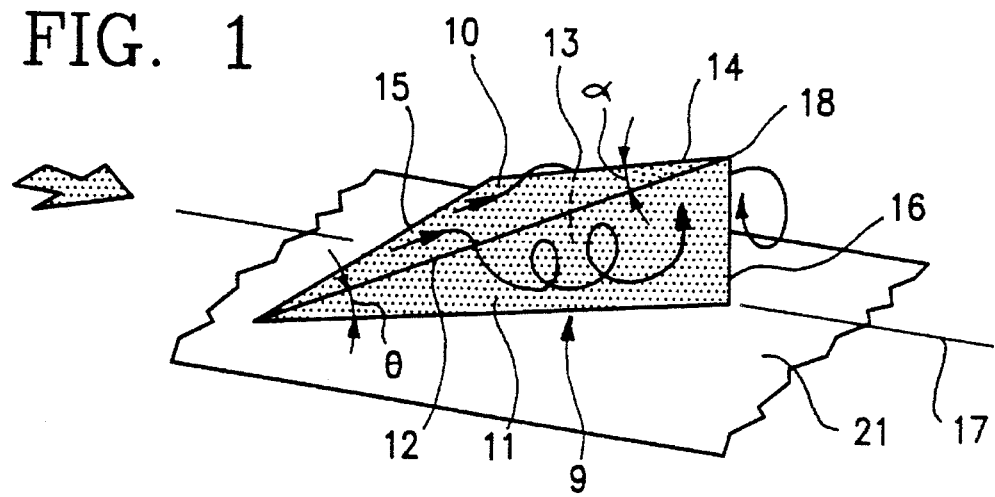
FIG. 1 shows, diagrammatically, a perspective representation of a vortex generator.

Referring now to the drawings, wherein like reference numerals designate identical or corresponding parts throughout the several views, in which the flow direction of the working media is indicated by arrows and in which elements not essential to the invention (such as casings, fastenings, conduit lead-throughs and the like) are omitted, the vortex generator 9 essential to the mode of operation of the invention is described first before the actual mixing chamber is considered.

Figure 2:
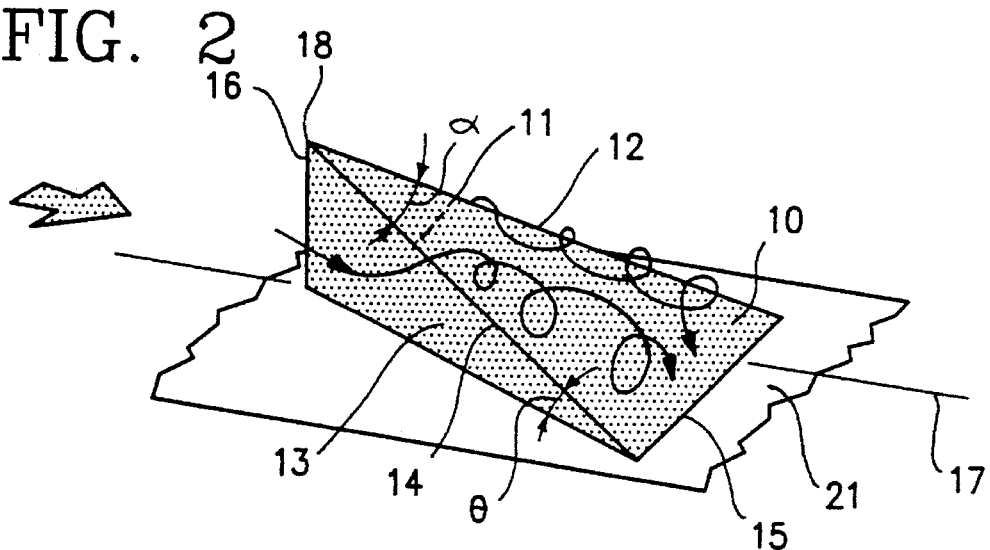
FIG. 2 shows, diagrammatically, an arrangement variant of the vortex generator.

FIGS. 1 and 2 do not show the actual duct through which the main flow (symbolized by the large arrow) takes place. As shown in these figures, a vortex generator consists essentially of three triangular surfaces around which flow takes place freely. These are a top surface 10 and two side surfaces 11 and 13. In their longitudinal extent, these surfaces extend at certain angles in the flow direction.

In all the examples shown, the two side surfaces 11 and 13 are at right angles to the duct wall 21 but it should be noted that this is not imperative. The side walls, which consist of right-angle triangles, are fixed with their long sides on the duct wall 21, preferably in a gas-tight manner. They are oriented in such a way that they form a joint on their short sides and enclose an acute angle α. The joint is designed as a sharp connecting edge 16 and is also at right angles to the duct wall 21 which the side surfaces abut. The two side surfaces 11, 13 enclosing the acute angle α are symmetrical in shape, size and orientation and are arranged on both side of an axis of symmetry 17. This axis of symmetry 17 is parallel to the duct axis.

An edge 15 of the top surface 10, which has a very sharp configuration and extends transverse to the duct axis through which flow takes place, is in contact with the same duct wall 21 as the side walls 11, 13. The longitudinally directed edges 12, 14 of the top surface 10 abut the longitudinally directed edges of the side surfaces 11, 13 protruding into the flow duct. The top surface 10 extends at an angle of incidence Θ to the duct wall 21. Its longitudinal edges 12, 14, together with the connecting edge 16, form a point 18.

The vortex generator 9 can also, of course, be provided with a bottom surface by means of which it is fastened to the duct wall 21 in a suitable manner. Such a bottom surface, however, has no connection with the mode of operation of the element.

In FIG. 1, the connecting edge 16 of the two side surfaces 11, 13 forms the downstream edge of the vortex generator. The edge 15 of the top surface 10, extending transverse to the duct axis through which flow takes place is therefore the edge which the duct flow meets first.

The mode of operation of the vortex generator is as follows. When flow takes place around the edges 12 and 14, the main flow is converted into a pair of opposing vortices whose axes are located in the axis of the main flow. The swirl number and the location of vortex breakdown, where the latter is desirable at all, are determined by appropriate selection of the angle of incidence Θ and the acute angle α. With increasing angles, the vortex strength and the swirl number are increased and the location of the vortex breakdown moves upstream into the region of the vortex generator itself. These two angles Θ and α are specified, depending on the application, by design requirements and by the process itself. It is then only necessary to match the height h of the connecting edge 16 (FIG. 3a).

Figure 3A:
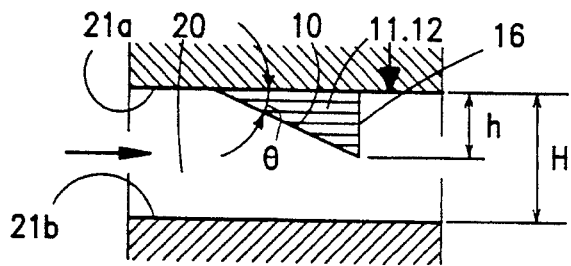
FIGS. 3a–c show, diagrammatically, the group arrangement of vortex generators in a duct in longitudinal section, in a plan view and in a rear view.
Figure 4A:
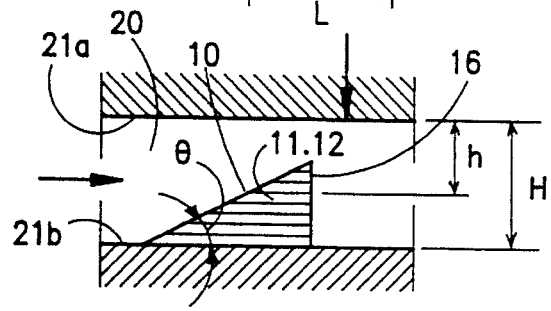
FIGS. 4a–c show, diagrammatically, an embodiment variant of a group arrangement of vortex generators in the same representation as FIG. 3 with a variant of the secondary flow guidance.

In FIGS. 3a and 4a, in which the duct through which flow takes place is indicated by 20, it may be recognized that the vortex generator can have a different height relative to the duct height H. In general, the height h of the connecting edge 16 will be matched to the duct height H in such a way that the vortex generated has already reached such a size immediately downstream of the vortex generator that the complete duct height H is filled. This leads to an even velocity distribution in the cross section acted on by the vortex generator. A further criterion, which can have an influence on the ratio h/H to be selected, is the pressure drop which occurs when flow takes place around the vortex generator. It is obvious that as the ratio of h/H increases, the pressure loss coefficient will also increase.

In contrast to FIG. 1, the sharp connecting edge 16 in FIG. 2 is the position which the duct flow meets first. The element 9 shown in FIG. 2 is rotated by 180° compared to the orientation shown in FIG. 1. As may be recognized from the representation, the two opposing vortices have changed their direction of rotation.

Figure 3B:
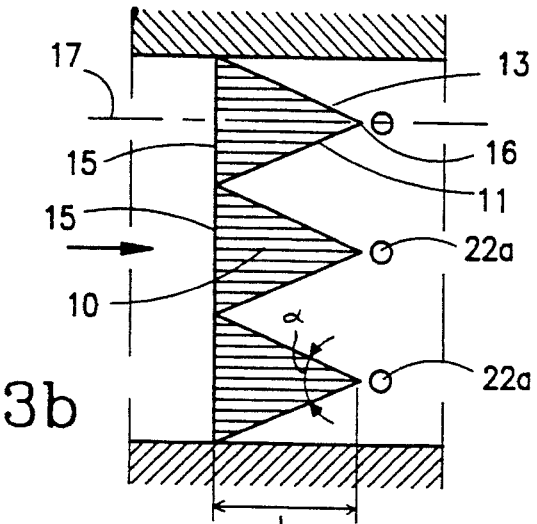

FIG. 3b shows how a plurality of vortex generators, in this case three, are arranged adjacent to one another without intermediate spaces over the width of the duct through which flow takes place. In this case, the duct 20 has a rectangular shape but this, however, is not essential to the invention.

Figure 3C:
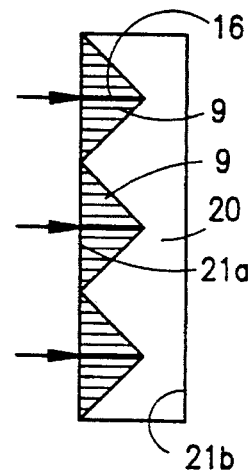
Figure 4B:
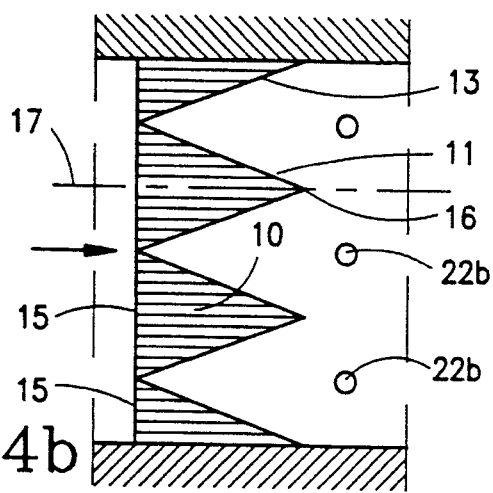
Figure 4C:
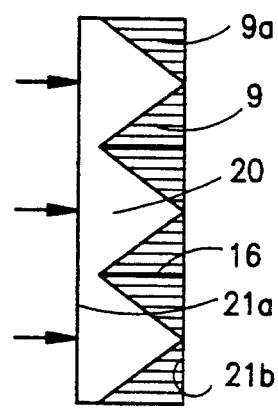

FIGS. 4a–c show a variant with two complete vortex generators and, on both sides of them, two half vortex generators. For the same duct height H and the same angle of incidence Θ of the top surface 10 as in FIGS. 3a–c, the elements differ, in particular, because of their greater height h. For the same angle of incidence, this necessarily leads to a larger length L of the element and in consequence—because the pitch is the same—it also leads to a smaller angle α. Compared with FIGS. 3a—c, the vortices generated will have less swirl but will completely fill the duct cross section within a shorter interval. If vortex breakdown is intended in both cases—in order to stabilize the flow, for example—this will take place later in the case of the vortex generator of FIGS. 4a–c than it does with that of FIGS. 3a–c.

The ducts shown in FIGS. 3a–c and 4a–c represent rectangular mixing chambers. It should again be noted that the shape of the duct through which flow takes place is not essential to the mode of operation of the invention. Instead of the rectangle shown, the duct could also be an annular segment, i.e. the walls 21a and 21b would be curved. The above statement that the side surfaces are at right angles to the duct wall must, of course, be considered in a relative manner in such a case. The essential point is that the connecting edge 16 located on the line of symmetry 17 is at right angles to the corresponding wall. In the case of annulus walls, the connecting edge 16 would therefore be directed radially, as is represented in FIG. 5.

Figure 5:
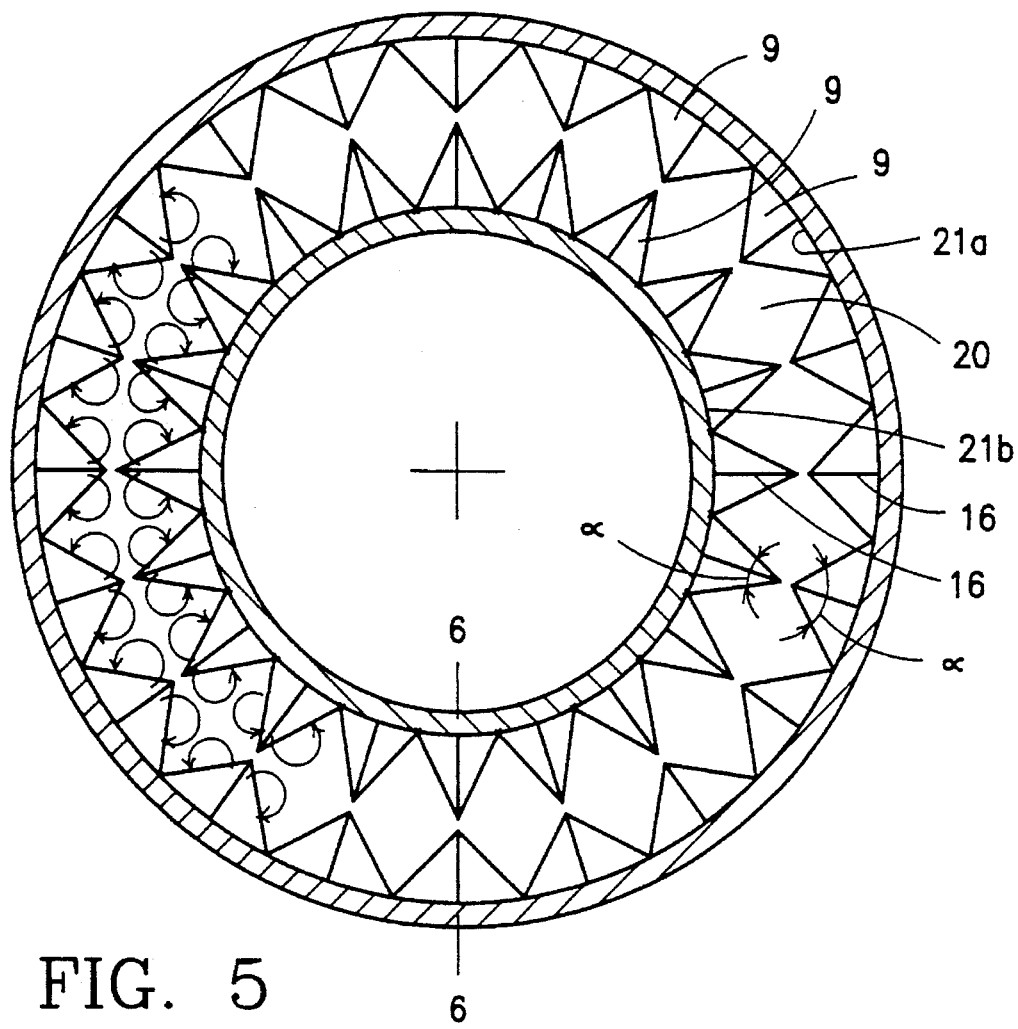
FIG. 5 shows, diagrammatically, the annular combustion chamber of a gas turbine with vortex generators installed.
Figure 6:
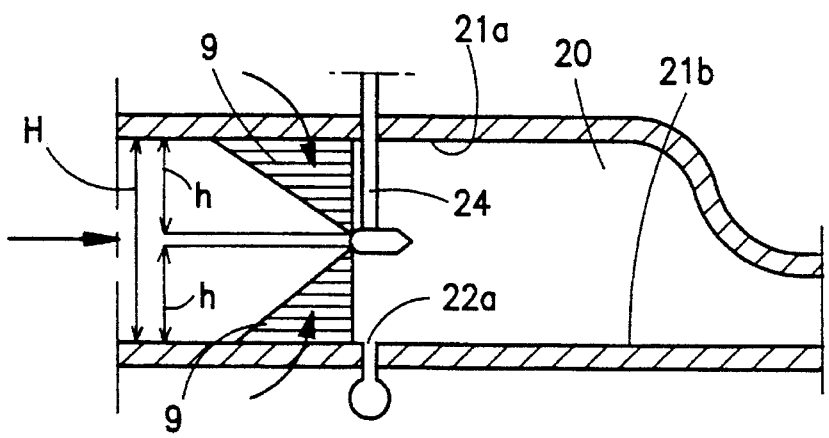
FIG. 6 shows, diagrammatically, a partial longitudinal section through a combustion chamber along the line 6—6 in FIG. 5.

FIGS. 5 and 6 show, in a simplified manner, a mixing chamber with an annular duct 20 through which flow takes place. This annular chamber could, for example, be the annular combustion chamber of a gas turbine. An equal number of vortex generators are arranged in a row in the peripheral direction on each of the two duct walls 21a and 21b in such a way that the connecting edges 16 of two opposite vortex generators are located in the same radial. If the same heights h are assumed for opposite vortex generators, it may be seen from FIG. 5 that the vortex generators have a smaller acute angle $\alpha$ on the inner duct annulus 21b. It may be recognized from the longitudinal section in FIG. 6 that compensation could be provided for this by means of a larger angle of incidence $\Theta$ if vortices of equal swirl are desired in the inner and outer annulus cross sections. In this solution, as is indicated in FIG. 5, two vortex pairs with smaller vortices are generated in each case and this leads to a shorter mixing length. The secondary flow, for example cooling air, could be fed into the main flow in this configuration in accordance with the methods of FIGS. 8 to 14, which are described later.

Two flows are mixed together with the aid of the vortex generators 9 in FIGS. 3a–c and 4a–c, which have already been described. The main flow in the form of combustion air—or combustion gas depending on the type of combustion chamber—attacks the transversely directed inlet edges 15 in the direction of the arrow. The secondary flow in the form of cooling air has a substantially smaller mass flow than the main flow. It is fed into the main flow in the immediate region of the vortex generators.

As shown in FIG. 3b, this introduction of air takes place by means of individual holes 22a which are applied to the wall 21a. The wall 21a is the wall on which the vortex generators are arranged. The holes 22a are located on the line of symmetry 17 downstream behind the connecting edge 16 of each vortex generator. In this configuration, the cooling air is inserted into the large-scale vortex which already exists.

FIG. 4b shows an embodiment variant of a mixing chamber in which the secondary flow is likewise introduced via wall holes 22b. The latter are located downstream of the vortex generators in the wall 21b on which the vortex generators are not arranged, i.e. on the wall opposite to the wall 21a. The wall holes 22b are respectively applied between the connecting edges 16 of two adjacent vortex generators, as may be seen from FIG. 4b. In this way, the cooling air passes into the vortex in the same way as in the embodiment of FIG. 3b. There is, however, the difference that it is no longer mixed into the vortex of a vortex pair generated by the same vortex generator but into one vortex each of two adjacent vortex generators. Because the adjacent vortex generators are arranged without an intermediate space and generate vortex pairs with the same direction of rotation, however, the introduction arrangements of FIGS. 3b and 4b have the same effect.

Figure 7:
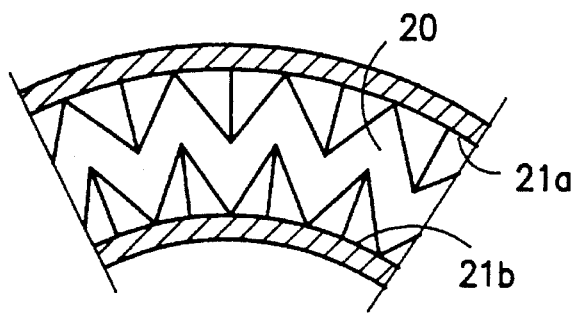
FIG. 7 shows, diagrammatically, a second arrangement variant for the vortex generators.

The partial view in FIG. 7, like FIG. 5, shows an annular duct 20 in which an equal number of vortex generators 9 are arranged in a row in the peripheral direction both on the outer annulus wall 21a and on the inner annulus wall 21b. As a departure from FIG. 5, however, the connecting edges 16 of each two opposite vortex generators are offset relative to one another by half a pitch. This arrangement offers the possibility of increasing the height h of the individual elements. Downstream of the vortex generators, the vortices generated are combined with one another which, on the one hand, further improves the mixing quality and, on the other, leads to an increased vortex life.

FIGS. 8 to 14 show further possible ways of feeding the secondary flow into the main flow, cold cooling air to be mixed with hot combustion air or combustion gases being, for example, involved.

Figure 8:
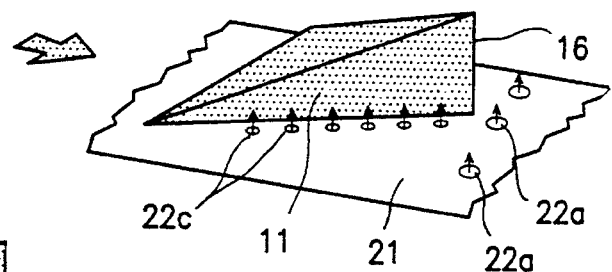
FIGS. 8–13 show, diagrammatically, a third to a ninth variant of the secondary flow guidance.

As shown in FIG. 8, the cooling air is introduced by means of wall holes 22c—in addition to the holes 22a already described downstream of the vortex generators—which wall holes 22c are located immediately adjacent to and in the longitudinal extent of the side walls 11, 13 in the same wall 21a on which the vortex generators are arranged. Feeding the secondary flow through the wall holes 22c provides additional momentum to the vortices generated and this increases their life.

Figure 9:
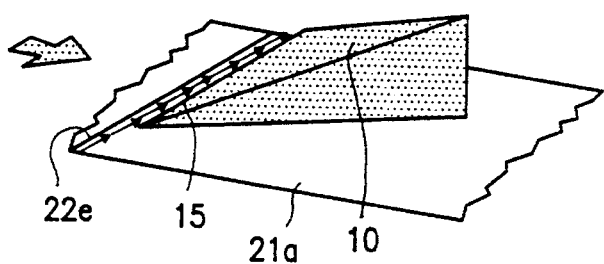
Figure 10:
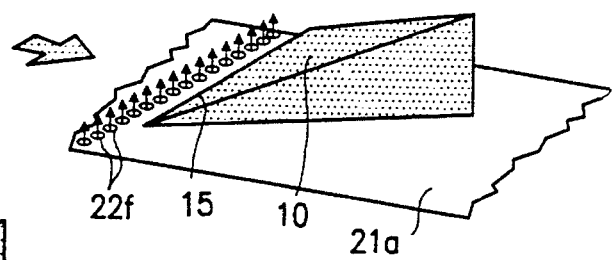

As shown in FIGS. 9 and 10, the cooling air is introduced, on the one hand, by means of a slot 22e or by means of wall holes 22f. These are located in the same annulus wall 21a on which the vortex generators are arranged and immediately before and in the longitudinal extent of the edge 15, of the top surface 10, extending transverse to the duct through which flow takes place. The geometry of the wall holes 22f or of the slot 22e is selected in such a way that the cooling air is introduced at a certain injection angle into the main flow and flows around the following vortex generator as a protective film against the hot main flow.

In the examples described below, the secondary flow is fed through the duct wall 21a into the hollow internal space of the vortex generator via means which are not shown.

Figure 11:
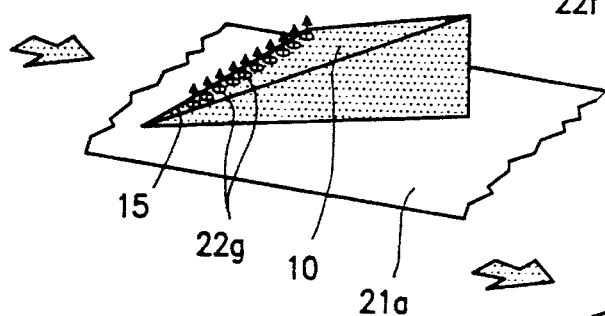

As shown in FIG. 11, the cooling air is introduced via wall holes 22g which are located within the top surface 10 immediately behind and in the longitudinal extent of the edge 15 extending transverse to the duct through which flow takes place. The cooling of the vortex generator takes place externally rather than internally in this case. The emerging secondary flow forms a protective layer when it flows around the top surface 10 and screens the latter from the hot main flow.

Figure 12:
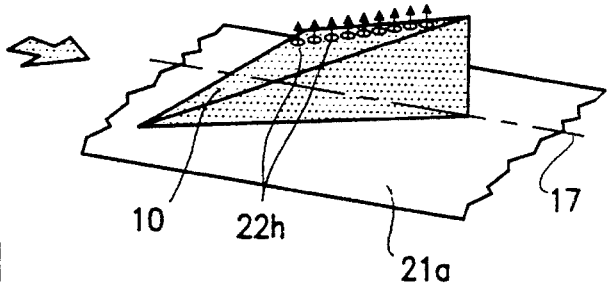

As shown in FIG. 12, the cooling air is introduced via wall holes 22h which are arranged within the top surface 10 in a row along the line of symmetry 17. The duct walls are particularly well protected from the hot main flow by means of this variant because the cooling air is initially guided on the outer periphery of the vortex.

Figure 13:
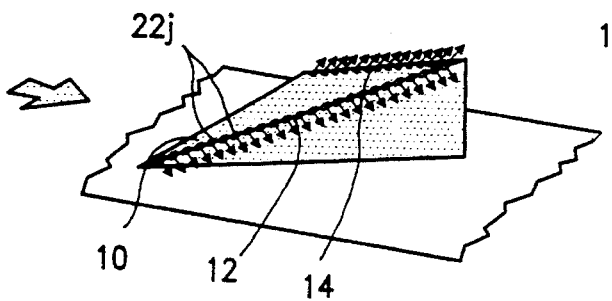

As shown in FIG. 13, the cooling air is introduced via wall holes 22j which are located in the longitudinally directed edges 12, 14 of the top surface 10. This solution ensures good cooling of the vortex generators because the cooling air emerges at the extremities and therefore flushes completely round the inner walls of the element. The secondary flow is put directly into the resulting vortex in this case and this leads to defined flow relationships.

Figure 14:
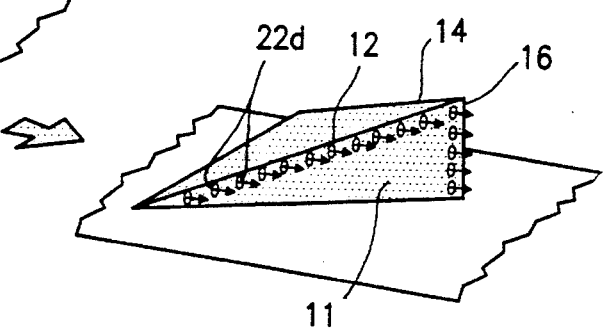

In FIG. 14, the introduction of the air takes place via wall holes 22d, which are located in the side walls 11 and 13 in the region of the longitudinal edges 12 and 14, on the one hand, and in the region of the connecting edge 16, on the other. This variant has a similar effect to that produced by using the holes 22a in FIG. 8 and using the holes 22j in FIG. 11.

If, for example, the mixing chamber is a combustion chamber, the fuel—oil as a rule—is introduced via a central fuel lance 24 whose opening is located downstream of the vortex generators 9 in the region of their point 18, as shown in FIG. 6. The introduction of the cooling air takes place in two ways in this example. On the one hand, as is indicated by arrows, it is introduced via wall holes in the vortex generators themselves in accordance with one of the methods shown in FIGS. 11 to 14, and on the other, it is introduced via wall holes 22a in the duct wall 21b, it being possible to supply these wall holes by means of a ring main.

If a vortex generator configuration as shown in FIG. 6 with central introduction of the fuel via a lance 24 is taken as a basis, the vortex generators 9 are designed in such a way that recirculation zones are substantially avoided. Because of this, the residence time of the fuel particles in the hot zones is very short and this has favorable effects on minimum formation of $NO_x$. The fuel introduced is entrained by the vortices and mixed with the main flow. It follows the helical path of the vortex and is evenly and finely distributed in the chamber downstream of the vortices.

As a departure from previously shown vortex generators, the two side surfaces 11, 13, of the vortex generator 9, enclosing the acute angle α could also have different lengths L. In this case, the top surface 10 with an edge 15 extending obliquely to the duct 20 through which flow takes place would be in contact with the same duct wall 21 as the side walls and would have a different angle of incidence Θ over the width of the vortex generator. Such a variant has the effect that vortices with different strengths are generated. A swirl adhering to the main flow can, for example, be acted upon by this means. On the other hand, however, swirl can be imposed, by the different vortices, downstream of the vortex generators on the originally swirl-free main flow. Such a configuration is particularly suitable as an independent, compact burner unit. When a plurality of such units is used, for example in a gas turbine annular combustion chamber, the swirl imposed on the main flow can be used in order to improve the cross-ignition behavior of the burner configuration, at part load for example.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mixing chamber for mixing a gaseous secondary flow that is introduced into a gaseous, ducted main flow, the secondary flow having a substantially smaller mass flow than the main flow, comprising:

a duct in which flow takes place in a flow direction;

a plurality of vortex generators arranged in the duct adjacent to one another and without intermediate spaces over a dimension of the duct transverse to the flow direction of the duct, a height of the vortex generators being at least 50% of one of a height of the duct and a complete height of a duct part associated with the vortex generators, and means for introducing the secondary flow into the duct in an immediate region of the vortex generators;

wherein each vortex generator has three surfaces extending from a duct wall around which flow takes place freely, which surfaces extend longitudinally in the flow direction of the duct, a first surface forming a top surface and a second and third surface forming side surfaces, wherein the side surfaces each on a single edge abut the duct wall and enclose an acute angle, wherein a top surface edge extending transverse to the flow direction of the duct is in contact with the duct wall, and wherein longitudinally directed edges of the top surface abut longitudinally directed edges of the side surfaces protruding into the flow duct, the top surface extends at a predetermined angle of incidence to the duct wall.

2. The mixing chamber as claimed in claim 1, wherein the ratio between the height of the vortex generators and the duct height is selected in such a way that the vortices generated fills the complete duct height immediately downstream of the vortex generators.

3. The mixing chamber as claimed in claim 2, wherein the side surfaces of each vortex generator enclosing the acute angle define a connecting edge that terminates in a point in the flow duct, and wherein the duct comprises a self-igniting reheat chamber, and includes a plurality of fuel lances, each fuel lance positioned downstream of a vortex generator with a fuel opening of the lance disposed in a region of the connecting edge point.

4. The mixing chamber as claimed in claim 1, wherein the two vortex generator side surfaces enclosing the acute angle are arranged symmetrically about an axis of symmetry.

5. The mixing chamber as claimed in claim 4, wherein the two side surfaces enclosing the acute angle define a connecting edge which, together with the longitudinally directed edges of the top surface, form a point and wherein the connecting edge extends at right angles to the duct wall which the side surfaces abut.

6. The mixing chamber as claimed in claim 5, wherein at least one of the connecting edge and the longitudinally directed edges of the top surface are configured so as to be at least approximately sharp.

7. The mixing chamber as claimed in claim 5, wherein the axis of symmetry of each vortex generator extends parallel to the flow direction of the duct, and each vortex generator is positioned so that the connecting edge of the two side surfaces forms a downstream edge of the vortex generator and the top surface edge extending transverse to the flow direction of the duct is an upstream edge of the vortex generator.

8. The mixing chamber as claimed in claim 5, wherein the duct is annular, the vortex generators are arranged in a row in a peripheral direction on at least one of an inner and outer annular duct wall and wherein the means for introducing the secondary flow includes a plurality of duct wall holes, at least one hole being located along each vortex generator line of symmetry downstream and immediately behind the connecting edge in the annular duct wall on which the vortex generators are arranged.

9. The mixing chamber as claimed in claim 5, wherein the means for introducing the secondary flow includes a plurality of holes which are located in the side surfaces of each vortex generator in at least one of a region of the longitudinally directed edges of the top surface and a region of the connecting edge.

10. The mixing chamber as claimed in claim 4, wherein the means for introducing the secondary flow includes a plurality of holes located in the top surface in the axis of symmetry.

11. The mixing chamber as claimed in claim 4, wherein the means for introducing the secondary flow includes a plurality of holes located in the longitudinally directed edges of the top surface.

12. The mixing chamber as claimed in claim 1, wherein the two vortex generator side surfaces enclosing the acute angle have different lengths so that the edge of the top surface in contact with the duct wall extends obliquely to the flow direction of the duct, the angle of incidence of the top surface relative to the flow direction in the duct varies over the width of the vortex generator.

13. The mixing chamber as claimed in claim 1, wherein at least one of the angle of incidence of the top surface and the acute angle enclosed by the side surfaces is selected so that a vortex generated by the mixing flow moving over each vortex generator breaks down in a region of the vortex generator.

14. The mixing chamber as claimed in claim 1, wherein the duct is annular and wherein an equal number of vortex generators are arranged in a row in a peripheral direction both on a radially outer annulus wall and on a radially inner annulus wall, the vortex generators on the outer annulus wall being positioned relative to an opposing vortex generator on the inner annulus wall with connecting edges of the opposing vortex generators being aligned on a single radial line of the annular duct.

15. The mixing chamber as claimed in claim 1, wherein the duct is annular and wherein an equal number of vortex generators are arranged in a row in a peripheral direction both on a radially outer annulus wall and on a radially inner annulus wall, the vortex generators on the outer annulus wall being positioned relative to the vortex generators on the inner annulus wall so that connecting edges of the vortex generators on opposing duct walls are relatively offset by half a pitch.

16. The mixing chamber as claimed in claim 1, wherein the duct is annular shaped and the means for introducing the secondary flow includes a plurality of wall holes located in the duct wall immediately adjacent to and along the longitudinal direction of the side surfaces of each vortex generator.

17. The mixing chamber as claimed in claim 1, wherein the means for introducing the secondary flow comprises one of a slot and a plurality of duct wall holes located adjacent to each vortex generator along the edge of the top surface extending transverse to the flow direction of the duct in contact with the wall on which the vortex generators are arranged.

18. The mixing chamber as claimed in claim 1, wherein the means for introducing the secondary flow comprises a plurality of holes located on the top surface immediately behind the top surface edge extending transverse to the duct, the holes positioned in line in the flow direction of the duct.

* * * * *